United States Patent [19]

Nakamura et al.

[11] 4,419,009
[45] Dec. 6, 1983

[54] DATA CONVERTING METHOD FOR REORDERED PRINTS

[75] Inventors: Tadashi Nakamura, Hino; Haruo Hara, Hachioji, both of Japan

[73] Assignee: Konishiroku Photo Industry Co., Ltd., Tokyo, Japan

[21] Appl. No.: 261,251

[22] Filed: May 6, 1981

[30] Foreign Application Priority Data

May 20, 1980 [JP] Japan .................................. 55-66994

[51] Int. Cl.³ ............................................ G03B 27/10
[52] U.S. Cl. ..................................... 355/103; 235/435
[58] Field of Search ........................ 235/435; 355/103

[56] References Cited

U.S. PATENT DOCUMENTS

| 1,413,598 | 4/1922 | Lawley | 355/103 |
| 3,492,071 | 1/1970 | Limnios | 355/103 |
| 3,935,434 | 1/1976 | Rice | 355/103 |

Primary Examiner—Harold I. Pitts
Attorney, Agent, or Firm—Jordan B. Bierman; Linda Bierman

[57] ABSTRACT

A data converting method for reordered prints in which print data given in the terms of a length from the end of a film strip is converted into a data from the end of said film strip with reference to a notch. A length from the end of the film strip to a frame to be printed according to the reorder is measured on the basis of the print data, so that a notch formed at a portion other than that corresponding to said length is accepted as information of no print, whereas a notch formed at the corresponding portion is accepted as information of print. In case there is formed no notch at the portion corresponding to the frame to be printed, a notch is newly formed with reference to the frame of the corresponding portion and the newly formed notch is accepted as information of print.

1 Claim, 4 Drawing Figures

PRIOR ART   FIG. 1
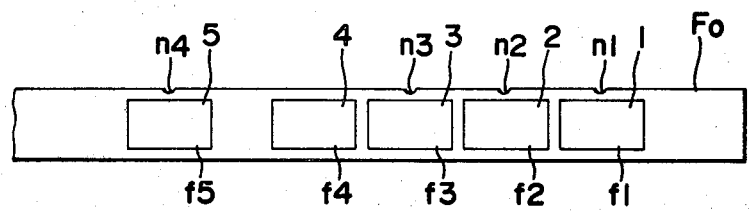
PRIOR ART   FIG. 2
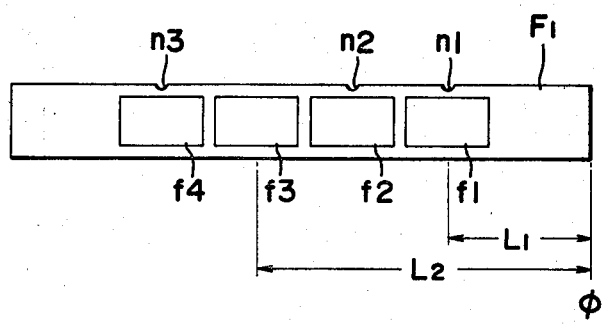

DATA CONVERTING METHOD FOR REORDERED PRINTS

BACKGROUND OF THE INVENTION

1. Field of the Invention

The present invention relates to a method of converting print data to the printing treatment of reordered prints.

2. Description of the Prior Art

In the color print system at a developing station, only the so-called "simultaneous print system", in which the prints asked for an excellent negative film together with the development of a film for a customer, is made automatic, whereas the reorder print system, in which additional prints are ordered, falls behind. This is caused by the fact that there is great difference in the acceptance of the order between the simultaneous prints and the reordered prints, which raises obstruction in the automation of the reordered prints.

First of all, the process and data modes of a known simultaneous print system will be described. As shown in FIG. 1, negative color films of 35 mm width having been developed are spliced into a long film, and this long film is punched at its one edge with crescent notches in a manner to correspond to its respective frames (generally at the center position of each frame) in a predetermined direction by the action of a notcher (not shown) or an auto-notcher. In the meantime, print data $D_o$ with reference to the aforesaid notches are recorded on an information medium such as a magnetic or paper tape. In FIG. 1, for example, by the use of the auto-notcher: a notch 1 (n1) is formed to correspond to a frame 1 (f1) on a film $F_o$; a notch 2 (n2) is formed to correspond to a frame 2 (f2); and a notch 3 (n3) is formed to correspond to a frame 3 (f3). If it is judged by the auto-notcher that a frame 4 (f4) is so remarkably under- or over-exposed that it has a negative density unsuitable for the printing treatment, no notch is formed at that frame 4 (f4). As a result, a notch 4 (n4) is formed at the subsequent frame 5 (f5). Next, the example of the print data $D_o$, which are recorded in the information medium for such film $F_o$ by the operator, will be described. Information of print (PO) is accepted for the frame 1 formed with the notch (n1) so that information of sheet number S, print correcting data D and so on are recorded. For the frame 2 (f2) formed with the notch 2 (n2), of a condition of out of focus or the like is judged not by the auto-notcher but by the operator, the frame 2 is judged as improper for the printing treatment so that information of no print (PX) is accepted. For the frame 3 (f3) formed with the notch 3 (n3), the print information (PO) is accepted so that the sheet number information S, the print correcting data D and so on are recorded. For the frame 5 (f5) formed with the subsequent notch 4 (n4), the print information (PO) is accepted so that the sheet number information S, the print correcting data D and so on relating to the frame 5 (f5) are similarly recorded. If the film $F_o$ and the information medium $D_o$ thus far described are introduced into a printer, the printing treatment is carried out with no attendant.

In the simultaneous print system described hereinbefore, as is apparent from the example taken, the print data are gathered, and the printing treatment is carried out both with reference to the notches from the film edge. In the reorder print system, on the contrary, trials for automation have been made but are all still in an unsatisfactory condition. This is partly because the film kept by the customer and intended to be reordered is cut into a film strip having a length corresponding to about six frames and partly because the reorder of the customer ignores the notches and is made in the form of either the frame numbers formed outside of the frames of the film strap or the frames corresponding to the distances from a certain reference such as the second frame from the reference (e.g., the righthand end of the film strip). Turning to FIG. 2, there is shown the process and data modes of the reordered print according to the method which is disclosed in Japanese Patent Laid Open No. 60428/81. In case, for a film strip $F_1$, the frames at distances $L_1$, $L_2$ and so on from a reference end $\phi$ are reordered, the print data are indicated at $D_1$. More specifically, an order 1 (O–NO1) is located at a distance (L) of $L_1$ from the reference end $\phi$, and the sheet number information S, the print correcting data D and so on are recorded. On the other hand, for the frame f3 which has been unnotched because its negative density is improper, a reorder 2 (O–NO2) for reprint may be accepted in accordance with the desire of the customer. Since the print data $D_1$ thus made have their distances $L_1$ and $L_2$ indicating not the center positions of the respective frame f1 and f3 but the general frame positions, it is impossible to accomplish the printing treatment with no attendant even if the film strip $F_1$ and the print data $D_1$ thus far described are introduced into the printer.

SUMMARY OF THE INVENTION

It is, therefore, an object of the present invention to convert the data of reordered prints thereby to reduce the man power consumption through the unattended treatment.

According to a feature of the present invention, there is provided a data converting method for reordered prints in which a print data given in the terms of a length from the end of a film strip is converted into a data from the end of said film strip with reference to a notch characterized: in that a length from the end of the film strip to a frame to be printed according to the reorder is measured on the basis of the print data, so that a notch formed at a portion other than that corresponding to said length is accepted as information of no print whereas a notch formed at the corresponding portion is accepted as information of print; in that, in case there is formed no notch at the portion corresponding to the frame to be printed, a notch is newly formed with reference to the frame of the corresponding portion; and in that the newly formed notch is accepted as information of print.

BRIEF DESCRIPTION OF THE DRAWINGS

Other objects and features of the present invention will become apparent from the following description taken in conjunction with the accompanying drawings, in which:

FIG. 1 is an explanatory view showing the relationship between the film and the print data in the simultaneous print system;

FIG. 2 is an explanatory view showing the relationship between the film strip and the print data in the reorder print system according to the prior art;

DETAILED DESCRIPTION OF THE PREFERRED EMBODIMENT

Figure 3:
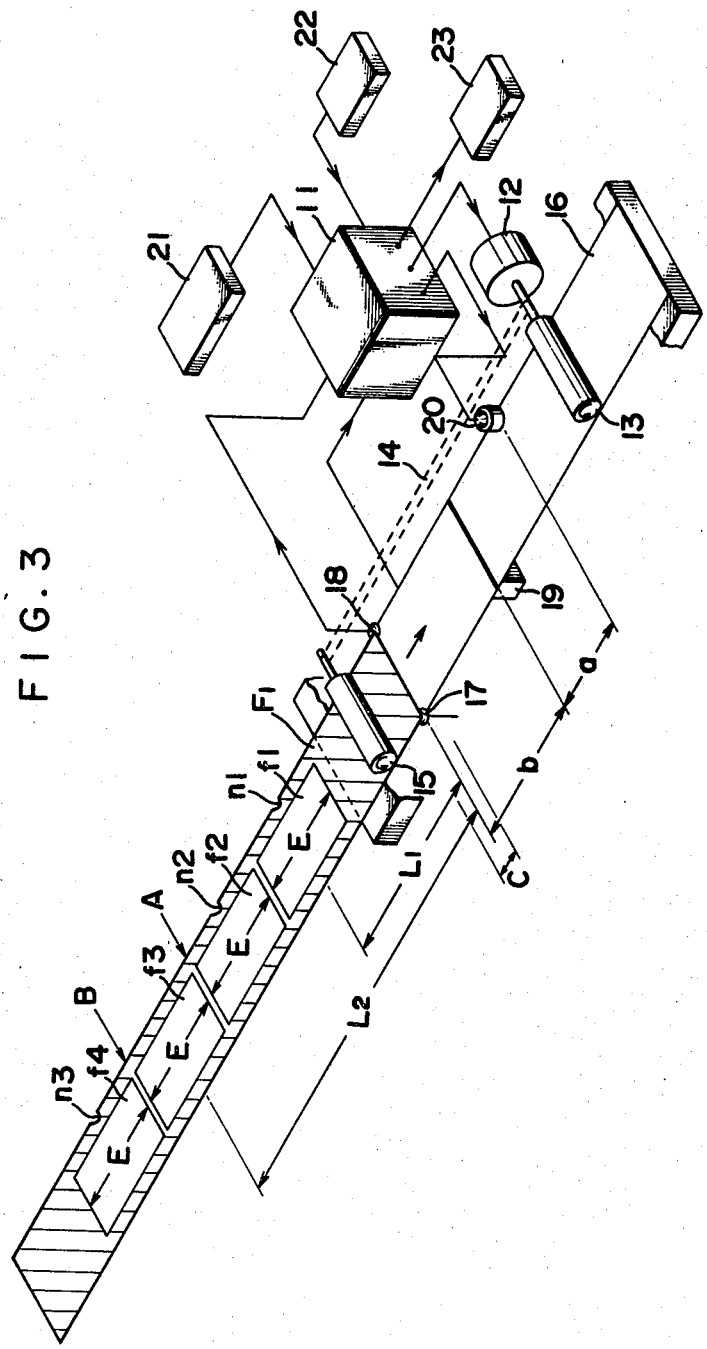
FIG. 3 is a perspective view showing the construction of a notcher to be used for practising the present invention.
Figure 4:
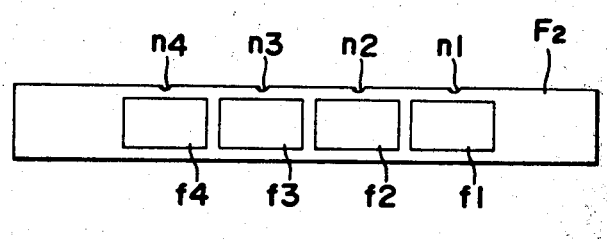
FIG. 4 is an explanatory view showing the relationship between the film strip, which has been treated by means of the notcher shown in FIG. 3, and the print data.

Referring now to FIG. 3, the method according to the present invention will be described along with the notcher to be directly used for practising the present invention. The notcher, as shown in FIG. 3, is a device which is made operative to partly to effect the aforementioned data conversion and partly to punch a notch at a corresponding position of the aforementioned frame f3 which has been left unnotched to FIG. 2, for example. The present device is wholly controlled by a controller 11. First of all, the data in such a form as is indicated at $D_1$ in FIG. 2 are either keyed in the controller 11 by means of a key board 21 or read out of the information medium such as the magnetic or paper tape by means of a reading unit 22 and are likewise stored in the controller 11. If, at this time, a start switch (not shown) is turned on, a pulse motor 12 starts its rotation. The rotation of this pulse motor 12 is converted directly into those of a roller 13 and indirectly through a power transmission system 14 into those of a roller 15. Now, if the film strip $F_1$ of FIG. 2 is inserted along a film guide passageway 16 from the lefthand side of the drawing, it is gradually conveyed to the right by the action of the roller 15. Reference numeral 17 indicates a film end detecting unit, and FIG. 3 shows the condition under which this film end detecting unit 17 detects the film end (relative to the reference $\phi$) of the film strip $F_1$. At this particular position, the controller 11 starts the pulse counting operation while the pulse motor 12 continuous its rotation. A notch detecting unit 18 is disposed at a position to face the film end detecting unit 17. Letters $L_1$, $L_2$ and so on indicate the order lengths which are measured from the film end when in the measurement upon the order acceptance to the frames to be printed. Unless the notch detecting unit 18 detects the notch within the film strip moving distance of $L_1 - C/2$, the no print information (PX) is fed out. (In the example of FIG. 3, there is no notch in the aforementioned distance). Incidentally, the letter C appearing in the above indicates the allowable error range of the lengths $L_1$, $L_2$ and so on when in the measurement upon the order acceptance and is empirically set at about 6 mm. If the film strip further advances so that the notch is detected within the range of $L_1 \pm C/2$, the print information (P0) for the notch 1 (n1) is fed out to a recording unit 23. In this recording unit 23, that print information is written as print data $D_2$ in the information medium such as the magnetic or paper tape. At this time, the records of the sheet number information S, the print correcting data D and so on, which are the information of the length $L_1$ recorded in the form of the previous print data $D_1$, are transferred to the print data $D_2$ (FIG. 4). After the measurements thus far described, the pulse motor continues rotating and counting. If the notch (i.e., n2 in the example) is detected within the range of $L_2 - C/2$ from the reference $\phi$, the no print information (PX) is fed out for the notch 2 (n2) and is recorded in the print data $D_2$. The pulse motor further continues rotating and counting. The film strip $F_1$ has no notch at a portion distance by $L_2 \pm C/2$ from the reference $\phi$. In other words, the frame f3 is required to be printed but has no notch at the corresponding position (generally at the center thereof).

If this particular case, the notch is punched at the corresponding position of the frame f3. This notch punching will be described hereinafter. The auto-notcher of the prior art is enabled to detect both the edge of the frame and the frame to be notched. In case it is judged by the notch detecting unit 18 that there is no notch in the range of $L_2 \pm C/2$, the edges A and B of the frame f3 are located within such ranges that the edge A is at a position of $E/2 + C/2$ downstream of and the edge B is at a position of $E/2 - C/2$ upstream of the notch detecting unit 18. Incidentally, the letter E appearing in the above indicates the width of the frame. It is, therefore, sufficient that the frame f3 extending within the range from $b - (E/2 + C/20$ to $b + (E/2 - C/2)$ is detected by means of a frame edge detecting unit 19 positioned a distance b downstream of the notch detecting unit 18 and is punched by means of a notch punching unit 20 positioned a distance a further downstream of the frame edge detecting unit 19.

By the processes thus far described, as shown in FIG. 4, the print data $D_1$ are converted into the data $D_2$, and the film strip $F_1$ is punched into the strip $F_2$. The data conversion and the notching process of the film described hereinbefore by way of example should not naturally be limited to the aforementioned embodiment. For example, although the foregoing description is concerned with the data conversion and the treatment of the film strip, a roll film which is elongated by connecting the film strips can be similarly treated if the film end detection enables the detection of the splices of the film strips. As to the hardware, the film end detecting unit 17 and the notch detecting unit 18 are positioned to face each other merely for convenience of explanation, but their positions should not be limited thereto. Moreover, it is possible to dispense with the notch punching unit by forming all the frames in advance with the notches upon the detections of the frames, and it is unnecessary according to that modification to treatment the film strips in dependence upon whether or not a notch is formed at the corresponding portion of the frame to be printed.

As to the software, on the other hand, it is possible to introduce the sheet number information S, the print correcting data D and so on either at the order of the reprints or at a subsequent step.

Still moreover, if only the frame to be printed is formed with the notch either by handling the film strip upside down or by disposing the notch detecting unit and the notch punching portion at the opposite side to that of the embodiment, the information of the necessity for the print for each notch is not required so that the data processing at the printer can be simplified.

As has been described hereinbefore by way of example, by converting the print data, which are given in terms of the length from the end of the film strip, into the data from the end of said film strip with reference to the notch, the printing operation subsequent to that step can be made unattended so that a remarkable effect can be attained for the reorder print system.

What is claimed is:

1. A data converting method for reordered prints from a film strip in which print or no print data represented by the distance of a frame from the end of the film strip has been converted into print or no print data determined by a notch on the film strip, which includes the steps of preparing print instructions for reordered prints determined solely by a predetermined distance from the end of the film strip to a desired frame, whereby a notch in the film strip beyond said predetermined distance will result in a no print signal and a notch in the film strip within said predetermined distance will result in a print signal, and forming a notch at an unnotched frame to be printed upon reorder when the desired frame falls within the intended prescribed distance, and using said newly formed notch as a print signal.

* * * * *